United States Patent
Cook et al.

(10) Patent No.: US 12,275,167 B1
(45) Date of Patent: Apr. 15, 2025

(54) MARINE VESSEL WITH INTEGRATED PLASTIC SHREDDING AND PELLETIZING SYSTEM FOR OCEAN CLEANUP AND REPURPOSING INTO PLASTIC ASPHALT

(71) Applicants: Zoey Cook, Little Rock, AR (US); Gregory Donald Carson, Rancho Cucamonga, CA (US)

(72) Inventors: Zoey Cook, Little Rock, AR (US); Gregory Donald Carson, Rancho Cucamonga, CA (US)

( * ) Notice: Subject to any disclaimer, the term of this patent is extended or adjusted under 35 U.S.C. 154(b) by 0 days.

(21) Appl. No.: 18/911,448

(22) Filed: Oct. 10, 2024

(51) Int. Cl.
*B29B 17/02* (2006.01)
*B02C 18/00* (2006.01)
(Continued)

(52) U.S. Cl.
CPC ...... *B29B 17/0412* (2013.01); *B02C 18/0084* (2013.01); *B02C 21/026* (2013.01); *B29B 17/0036* (2013.01); *B29B 17/02* (2013.01); *B63B 27/10* (2013.01); *B63B 27/30* (2013.01); *B63B 35/32* (2013.01); *B63B 35/44* (2013.01); *B02C 2201/06* (2013.01); *B29B 2017/0094* (2013.01); *B29B 2017/0476* (2013.01); *B63B 2035/4453* (2013.01); *B63B 2035/446* (2013.01)

(58) Field of Classification Search
CPC ...... Y02W 30/52; Y02W 30/62; B02C 21/02; B02C 21/026; B02C 18/0084; B02C 18/0092; B02C 2201/06; B02C 2201/063
See application file for complete search history.

(56) References Cited

U.S. PATENT DOCUMENTS 6,971,856 B1 12/2005 Mayfield et al.
7,198,213 B2 4/2007 Kolbet et al.
(Continued)

FOREIGN PATENT DOCUMENTS

EP 3943381 A1 * 1/2022
WO WO-2020193815 A1 * 10/2020

OTHER PUBLICATIONS

Global IP Trust, 'The Manta By The Sea Cleaners Collects Plastic Waste From The Oceans Ultimately Saving The Planet', https://www.youtube.com/watch?v=MONB85v9qJo, 2021 (Year: 2021).*

(Continued)

*Primary Examiner* — Jared O Brown
(74) *Attorney, Agent, or Firm* — Carson Patents; Gregory D Carson (57) ABSTRACT

A marine vessel designed for the collection, shredding, and pelletizing of oceanic plastic waste. The vessel uses renewable energy sources such as solar panels and wind turbines to power onboard systems, including AI-enhanced sensors that detect and target high-density areas of plastic debris. Once collected, the plastic is shredded and processed into uniform plastic pellets optimized for use in plastic asphalt production. The vessel also includes storage compartments for the pellets and a crane system for transferring containers filled with pellets to adjacent vessels or shore-based transport. This integrated system addresses inefficiencies in traditional ocean cleanup methods by enabling immediate onboard processing, reducing transportation needs, and repurposing plastic waste into a valuable industrial resource, while significantly minimizing environmental impact through sustainable energy use.

19 Claims, 2 Drawing Sheets

(51) Int. Cl.
  *B02C 21/02* (2006.01)
  *B29B 17/00* (2006.01)
  *B29B 17/04* (2006.01)
  *B63B 27/10* (2006.01)
  *B63B 27/30* (2006.01)
  *B63B 35/32* (2006.01)
  *B63B 35/44* (2006.01)

(56) References Cited

U.S. PATENT DOCUMENTS

| | | | |
|---|---|---|---|
| 8,535,107 B2 | 9/2013 | Lambert | |
| 9,988,836 B2 | 6/2018 | Judkins | |
| 11,254,397 B1 * | 2/2022 | Calvert | B63B 35/32 |
| 2020/0316611 A1 * | 10/2020 | Lindner | B02C 18/0092 |
| 2021/0214055 A1 | 7/2021 | Maydanik | |
| 2021/0223102 A1 | 7/2021 | Zhao et al. | |
| 2021/0363429 A1 | 11/2021 | Sarker et al. | |
| 2022/0177082 A1 * | 6/2022 | Na | B63B 35/32 |
| 2024/0034442 A1 * | 2/2024 | Covington | B63B 35/32 |

OTHER PUBLICATIONS

One Earth—One Ocean, 'Setting the Course for Maritime Plastic Waste Recycling', https://oneearth-oneocean.com/en/news/2023/setting-the-course-for-maritime-plastic-waste-recycling/ (Year: 2023).*
The Ocean Cleanup, 'The Ocean Cleanup Technologies B.V.', https://theoceancleanup.com (Year: 2024).*
One Earth—One Ocean E.V., retrieved Oct. 9, 2024 from https://oneearth-oneocean.com/en/news/2023/setting-the-course-for-maritime-plastic-waste-recycling/.
The Ocean Cleanup, The Ocean Cleanup Technologies B.V., retrieved Oct. 9, 2024 from https://theoceancleanup.com.
The SeaCleaners, retrieved on Oct. 9, 2024 from https://www.theseacleaners.org/the-manta-innovation/.

* cited by examiner

MARINE VESSEL WITH INTEGRATED PLASTIC SHREDDING AND PELLETIZING SYSTEM FOR OCEAN CLEANUP AND REPURPOSING INTO PLASTIC ASPHALT

BACKGROUND OF THE INVENTION

Technical Field

This invention relates generally to a marine vessel designed for environmental cleanup and waste processing in aquatic environments. More specifically, this invention pertains to an apparatus/device for the collection, shredding, and pelletizing of plastic waste from the ocean to facilitate its reuse in industrial applications, particularly in the construction of plastic asphalt for roads.

This invention relates generally to apparatuses and devices for marine debris removal, waste management, and recycling technologies, with a focus on mitigating oceanic plastic pollution. The method and apparatus can also be adapted for use with various types of oceanic waste materials, including macro-plastics, microplastics, and other floating debris. This invention relates more particularly to a marine vessel-based system designed to optimize the collection, processing, and conversion of oceanic plastic waste into high-value products, such as plastic pellets used in the production of plastic asphalt for road construction.

The present invention pertains to the field of marine environmental cleanup and recycling technologies, with particular relevance to vessels and apparatuses designed for the collection, processing, and conversion of oceanic plastic debris. This invention intersects with U.S. patent classifications in areas such as Class 114—Ships and Marine Structures, particularly subclass definitions concerning vessels equipped with material collection and processing systems, and Class 241—Solid Material Comminution or Disintegration, which covers apparatuses for shredding, grinding, or otherwise processing materials for recycling or repurposing.

More specifically, the invention relates to marine vessels that collect plastic waste from bodies of water, shred the plastic into smaller particles, and further process those particles into pellets for reuse in construction, particularly in plastic asphalt road applications. This technology addresses both environmental pollution and material reuse, aligning with U.S. patent classifications involving environmental cleanup (e.g., water pollution abatement) and materials recycling.

Additionally, this invention may encompass aspects of Class 366—Agitating (pelletizing systems), covering the mechanical processing of materials into pellets, and Class 29—Metal Working, which could apply to the mechanical structures and operations onboard the vessel involved in processing and repurposing plastic waste. The invention's use of renewable energy systems to power these operations may also cross into classifications related to green energy integration for industrial or marine applications.

Background Art

Description of the Related Art: The applicant is aware of several prior art references related to marine vessels designed for environmental cleanup, plastic waste processing, and material recycling. However, existing technologies present a number of limitations that the present invention seeks to address, particularly in the efficient collection and conversion of oceanic plastic waste into reusable materials such as plastic pellets for road construction.

Existing Marine Cleanup Technologies: Several prior art references describe marine vessels designed to collect floating plastic debris from the ocean. For example, systems have been developed that use mechanical arms, conveyor belts, or nets to gather waste from the ocean surface. These systems, while effective in collecting debris, often do not provide for comprehensive onboard processing of the collected plastic. In many cases, collected plastic is simply stored on the vessel until it can be brought to shore for further processing.

A notable limitation in prior systems is the lack of in-vessel processing. For instance, certain vessels focus solely on collection and transportation, missing the opportunity for immediate onboard shredding and processing into reusable materials. This results in inefficiencies, as the collected waste must undergo several stages of handling before it can be repurposed, adding logistical challenges and increasing the environmental footprint of the cleanup operations.

Lack of Onboard Pelletizing Systems: In prior art related to oceanic waste collection, there is a significant gap when it comes to converting shredded plastic waste into usable forms directly on the vessel. Existing vessels may incorporate shredders, but they often stop short of further processing the material into plastic pellets or other useful forms. For example, vessels equipped with shredders may break down the plastic into smaller pieces, but these pieces are then transported to onshore facilities for final recycling or disposal. The present invention addresses this gap by incorporating a pelletizing system that converts the shredded plastic directly into plastic pellets onboard the vessel. These pellets are specifically optimized for use in plastic asphalt production, thereby creating an immediate and practical use for the collected waste. This approach eliminates the need for transporting unprocessed material to land-based recycling facilities, significantly reducing logistical inefficiencies and the associated carbon footprint.

Energy Inefficiencies in Prior Systems: Another significant problem in the prior art is the reliance on conventional power sources, such as diesel engines, for operating marine cleanup vessels. These systems are not environmentally friendly and contribute to the very pollution they aim to mitigate. While renewable energy solutions, such as solar or wind power, have been integrated into some marine vessels, they are typically not used to power the more energy-intensive processes, such as shredding or pelletizing. The present invention incorporates renewable energy systems, including solar panels and wind turbines, to power the shredding, pelletizing, and plastic collection systems. This reduces the environmental impact of the cleanup operation itself, making the vessel self-sustaining and further addressing the carbon footprint issues present in existing technologies.

Lack of AI (Artificial Intelligence) Optimization in Plastic Collection: While some prior art references describe methods for collecting plastic debris from the ocean, they typically rely on manual or semi-automated systems to collect waste. This often results in inefficiencies in targeting high-density areas of plastic debris, leading to missed opportunities for optimizing the cleanup process. The present invention solves this problem by integrating AI-based sensors and automated collection systems. These technologies allow the vessel to detect and prioritize areas of the ocean with the highest concentrations of plastic waste. This not only increases the efficiency of the cleanup but also reduces time and energy consumption by avoiding low-density areas.

Problems Solved by the Present Invention

Onboard Processing of Plastic Waste: By integrating shredding and pelletizing systems into the vessel, the present invention allows for immediate conversion of plastic waste into reusable materials, such as plastic pellets for asphalt production, thereby solving the problem of inefficient post-collection handling.

Use of Renewable Energy: The reliance on renewable energy sources to power the vessel's operations addresses the environmental drawbacks of conventional diesel-powered systems, reducing the carbon footprint of oceanic waste cleanup.

Efficiency Through AI Optimization: The invention's AI-driven sensors and collection systems enhance the efficiency of marine debris removal by targeting high-density plastic areas, overcoming inefficiencies found in manual and semi-automated systems.

By combining these innovations, the present invention provides a comprehensive and efficient solution for addressing both oceanic plastic pollution and the need for recycled materials in industrial applications, particularly in road construction.

In light of the foregoing prior art, there is a need for a marine vessel equipped with an integrated plastic shredding and pelletizing system to better collect, process, and repurpose oceanic plastic waste in an energy-efficient and scalable manner, specifically for use in plastic asphalt production.

BRIEF SUMMARY OF THE INVENTION

Summary of the Invention: The present invention provides a marine vessel designed for the efficient collection, processing, and repurposing of oceanic plastic waste. The core inventive concept revolves around integrating multiple technologies—plastic waste collection, shredding, and pelletizing—into a single vessel, enabling immediate and sustainable repurposing of plastic debris at sea. This system is particularly optimized for producing plastic pellets suitable for use in plastic asphalt road construction, thus turning waste into a valuable resource.

In prior art, plastic waste collection is often limited to gathering and transporting debris to shore for further processing, which introduces inefficiencies, including increased logistical complexity, carbon footprint, and time delays. The present invention solves these issues by incorporating onboard shredding and pelletizing systems, enabling the vessel to immediately process collected plastic into reusable pellets.

Moreover, this invention includes advanced AI-based sensors and automated collection mechanisms that optimize the vessel's efficiency by detecting and targeting high-density areas of oceanic plastic waste. These sensors ensure that the vessel maximizes its collection efforts, reducing wasted energy and time while improving overall operational efficiency.

Another key feature of the invention is the use of renewable energy sources such as solar panels and wind turbines to power the vessel's shredding, pelletizing, and collection systems. This addresses the environmental concerns associated with conventional diesel-powered marine vessels, thus making the invention more sustainable and reducing its overall carbon footprint.

Advantages of the Invention

Efficient Plastic Waste Processing: The integration of shredding and pelletizing systems onboard the vessel eliminates the need to transport unprocessed waste to shore, significantly reducing logistical complexity and improving the efficiency of ocean cleanup operations.

Optimized Collection with AI: The use of AI and sensor technology to detect high-density plastic waste areas improves the targeting of plastic debris, resulting in more efficient use of time and energy.

Sustainable Power: By incorporating renewable energy systems, the invention reduces the carbon footprint of marine cleanup operations, making it environmentally friendly.

Direct Reuse in Construction: The produced plastic pellets are specifically tailored for use in plastic asphalt production, contributing to both environmental cleanup and infrastructure development.

The present invention represents a significant advancement in marine environmental technologies by addressing the inefficiencies and environmental impacts of current oceanic plastic waste collection methods while simultaneously providing a sustainable solution for repurposing waste into useful industrial materials.

According to a first aspect of the invention, there is a Marine Vessel with Integrated Plastic Shredding and Pelletizing System for Ocean Cleanup and Repurposing into Plastic Asphalt, comprising all features of claim 1: A plastic collection system configured to gather floating plastic debris from the ocean. A shredder operatively connected to the plastic collection system, configured to shred the collected plastic debris into smaller particles. A conveyor system configured to transport shredded plastic particles from the shredder to a pelletizing system. A pelletizing system configured to process shredded plastic particles into plastic pellets suitable for reuse in the production of plastic asphalt. A storage compartment for holding the plastic pellets onboard the vessel. A crane system configured to transfer containers filled with plastic pellets onto an adjacent vessel or transport vehicle. And A renewable energy power system, including solar panels and wind turbines, to operate the plastic collection, shredding, and pelletizing systems.

According to one aspect of the present invention, there is a Marine Vessel with Integrated Plastic Shredding and Pelletizing System in the form of a plastic processing system for the purpose of optimizing plastic waste collection and repurposing into construction material.

An advantage of the plastic processing system is its ability to process waste directly onboard the vessel, reducing the need for onshore handling and enabling immediate reuse of the collected material.

According to one aspect of the present invention, there is a Marine Vessel in the form of a renewable energy-powered system for the purpose of minimizing environmental impact while performing ocean cleanup operations.

An advantage of the renewable energy-powered system is the reduction of carbon emissions typically associated with marine waste collection vessels, making the operation more sustainable.

According to one aspect of the present invention, there is a Marine Vessel in the form of an AI-optimized plastic collection system for the purpose of automating and enhancing the targeting of high-density plastic debris areas in the ocean.

An advantage of the AI-optimized collection system is the increased efficiency in locating and collecting plastic waste, reducing time and energy consumption in marine debris removal.

The invention will now be described, by way of example only, with reference to the accompanying drawings in which:

DETAILED DESCRIPTION OF THE INVENTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Throughout this specification, the word "munch," or variations thereof such as "muncharoo" or "muncher," will be understood to imply the present invention. The inventor refers to the initial ship embodied as this invention by the shorthand term munch and or muncharoo. M.U.N.C.H.A.R.O.O.: Multi-functional Unit for Nutrient Collection, Harvesting, Aggregation, and Redistribution with Optimized Operation.

To "improve the mechanical properties" of plastic pellets when used in asphalt production, particularly in the context of the claims, means enhancing various physical and structural characteristics of the pellets to ensure they perform better when mixed with asphalt for road construction. Specifically, mechanical properties refer to aspects such as:

Tensile Strength: What it Means: Tensile strength refers to the ability of the plastic pellets to resist being pulled apart or stretched when mixed into the asphalt. By adding reinforcement additives like glass fiber, the tensile strength of the plastic pellets increases, allowing the asphalt mix to better withstand the stresses caused by traffic loads and temperature fluctuations. Benefit in Asphalt Production: Increased tensile strength means the asphalt mix will be more resistant to cracking, which is critical for maintaining the integrity of the road surface over time, especially under heavy or continuous traffic loads.

Flexural Strength: What it Means: Flexural strength is the ability of the material to resist bending forces. This property is crucial for ensuring that the asphalt can flex slightly under load without breaking or deforming. Benefit in Asphalt Production: When the plastic pellets are reinforced with additives like glass fibers, they contribute to the flexural strength of the asphalt, making the road surface less prone to deformation such as rutting or waves caused by heavy vehicles.

Impact Resistance: What it Means: Impact resistance is the ability of the material to absorb and dissipate energy from sudden impacts without fracturing. Benefit in Asphalt Production: Glass fibers and other reinforcement additives can enhance the impact resistance of the plastic pellets, which in turn makes the asphalt better able to withstand impacts from heavy vehicles, falling objects, and environmental factors like freeze-thaw cycles.

Elasticity: What it Means: Elasticity refers to the ability of the plastic pellets to return to their original shape after being deformed by stress. Benefit in Asphalt Production: Reinforcing the plastic pellets with additives improves their elasticity, allowing the asphalt to flex and adapt to the underlying terrain or shifting loads without cracking. This improves the lifespan of the road surface by reducing the likelihood of cracking due to thermal expansion or contraction.

Fatigue Resistance: What it Means: Fatigue resistance is the ability of a material to withstand repeated loading and unloading cycles without failing. Benefit in Asphalt Production: Asphalt is subjected to repeated traffic loads that can cause fatigue over time. Reinforced plastic pellets, particularly with the inclusion of glass fibers, can help the asphalt resist these repetitive stresses, minimizing the risk of cracks or potholes forming over time.

Adhesion Properties: What it Means: Adhesion properties refer to how well the plastic pellets bond with the asphalt binder and other materials in the mix. Benefit in Asphalt Production: By adding reinforcement additives, the surface texture and chemical bonding capabilities of the plastic pellets are improved, leading to better adhesion with the asphalt binder. This ensures a stronger and more cohesive mix, improving the overall durability of the asphalt.

Thermal Stability: What it Means: Thermal stability refers to the ability of the plastic pellets to maintain their mechanical properties at varying temperatures. Benefit in Asphalt Production: Roads are exposed to extreme temperature fluctuations, from freezing winters to hot summers. Reinforced plastic pellets with additives such as glass fibers enhance the thermal stability of the asphalt, preventing it from becoming brittle in cold weather or excessively soft in high temperatures.

Improving the mechanical properties of plastic pellets through reinforcement additives like glass fiber allows them to contribute significantly to the overall performance of asphalt. These improvements result in a road surface that is more durable, resistant to wear and tear, and better able to withstand the stresses and environmental conditions typical in road construction and use. Enhanced mechanical properties lead to longer-lasting roads, fewer repairs, and a more resilient infrastructure.

The real-time monitoring of oceanic conditions allows the plastic collection system to adjust the position of the marine vessel to optimize its efficiency in collecting plastic debris. Some possible oceanic conditions that could be monitored include:

Ocean Currents: Description: Ocean currents are continuous, directed movements of seawater generated by factors like wind, the Earth's rotation, salinity differences, and temperature variations. These currents can carry floating plastic debris over long distances. Impact on Collection Efficiency: Monitoring ocean currents helps predict where large amounts of plastic debris may accumulate, such as in oceanic gyres (e.g., the Great Pacific Garbage Patch). The vessel can adjust its course to intercept these currents and maximize collection.

Wind Speed and Direction: Description: Wind speed and direction influence the movement of surface debris. Strong winds can push floating plastics in a particular direction, concentrating them in certain areas. Impact on Collection Efficiency: Real-time wind monitoring enables the vessel to adjust its path based on wind patterns that may drive plastic debris toward shorelines or into convergence zones, where collection is easier and more efficient.

Wave Height and Sea State: Description: Wave height refers to the vertical distance between the crest of a wave and the preceding trough. Sea state is the overall condition of the ocean's surface based on wave activity. Impact on Collection Efficiency: High waves or rough sea conditions can disrupt plastic collection, making it difficult for mechanical arms, nets, or suction systems to operate efficiently. Monitoring wave heights allows the vessel to navigate to calmer areas, increasing the efficiency and safety of plastic collection.

Tides: Description: Tides are the regular rise and fall of sea levels caused by the gravitational pull of the moon and the sun. Tidal movements can influence the distribution and concentration of floating plastic debris, particularly near shorelines. Impact on Collection Efficiency: Monitoring tidal conditions enables the vessel to time its operations in coastal or shallow areas when debris is more concentrated and easier to collect, such as during high or low tide, depending on the location.

Temperature (Sea Surface Temperature): Description: Sea surface temperature (SST) is the temperature of the top layer of the ocean. This can vary due to seasonal changes, weather patterns, and geographical location. Impact on Collection Efficiency: Plastic debris may behave differently in warmer versus cooler waters, affecting how it floats or sinks. Additionally, warmer waters may indicate convergence zones where ocean currents meet, potentially concentrating plastic debris.

Salinity: Description: Salinity refers to the salt concentration in seawater. It can affect water density and influence how debris moves within the water column. Impact on Collection Efficiency: Variations in salinity, such as in estuaries or river mouths, can impact the buoyancy and movement of plastic debris. Monitoring salinity helps the vessel target areas where plastics may accumulate due to these changes.

Convergence Zones: Description: Convergence zones are areas where ocean currents meet, often forming gyres or eddies that trap floating debris. Impact on Collection Efficiency: Real-time detection of these zones allows the vessel to adjust its position to maximize debris collection in areas where plastic is naturally concentrated.

Debris Density (via AI-Driven Detection): Description: Using AI-based sensors, the system can monitor the density of plastic debris in the surrounding water in real-time, identifying regions with higher concentrations of plastic. Impact on Collection Efficiency: This monitoring helps the vessel focus on areas with the highest debris concentrations, minimizing unnecessary movement and maximizing the quantity of plastic collected per operation.

Climatic Conditions (Storms, Rainfall): Description: Storms, heavy rainfall, and other weather events can influence oceanic conditions, stirring up debris or pushing it toward certain areas. Impact on Collection Efficiency: Monitoring for incoming storms or heavy rains enables the vessel to avoid dangerous conditions while also capitalizing on areas where debris may be newly concentrated by storm activity.

By monitoring these oceanic conditions in real-time, the plastic collection system can dynamically adjust the vessel's position, improving the efficiency of plastic harvesting operations and maximizing the amount of debris collected from the ocean.

Plastic Debris of Varying Sizes: Definition: Refers to floating plastic waste found in the ocean that can range in size from tiny microplastics (less than 5 mm in diameter) to larger plastic items such as bottles, bags, and containers. Context in Claims: This term is used to describe the diverse range of plastic materials collected by the vessel, which can include both small particles and large, intact objects. The collection system is designed to handle this variation efficiently.

Densities and Sizes: Definition: Refers to the physical characteristics of the plastic debris, where density is the mass per unit volume (e.g., lightweight plastics like polyethylene vs. heavier plastics like PVC), and size refers to the physical dimensions (small particles to large objects). Context in Claims: The shredder and collection systems must adapt to plastic debris that varies in both density and size to optimize the shredding and pelletizing process.

Compartmentalized Sections: Definition: Refers to divisions within the storage compartments on the vessel that segregate plastic pellets based on specific criteria, such as size or material type. Context in Claims: These sections help organize the processed plastic pellets for efficient offloading and future use, preventing cross-contamination between different types or grades of plastic.

Material Properties or Size Distribution: Definition: Material properties include characteristics such as tensile strength, flexibility, thermal resistance, and chemical composition of the plastic pellets. Size distribution refers to the range of particle sizes within a batch of plastic pellets. Context in Claims: Compartmentalized sections store plastic pellets that vary in these properties, allowing the pellets to be tailored to specific applications, such as different layers in asphalt production.

Tracking Technologies to Ensure Seamless Logistics: Definition: Refers to the use of technologies such as RFID (Radio-Frequency Identification) or GPS (Global Positioning System) to monitor and manage the location and contents of containers filled with plastic pellets. Context in Claims: These technologies enable real-time tracking of containers from the marine vessel to their final destination, ensuring efficient logistics and proper inventory management for asphalt production.

Binding Agents: Definition: Chemical compounds added to plastic pellets to improve their adhesion to other materials, particularly in asphalt formulations. Examples include polymers or resins that help the plastic bind more effectively to bitumen (the asphalt binder). Context in Claims: Binding agents are introduced during pelletizing to enhance the integration of plastic pellets into asphalt mixtures, improving the strength and durability of the final product.

Particles of Varying Sizes: Definition: Refers to shredded plastic particles that differ in dimensions, typically tailored to the specific requirements of different asphalt formulations. Particle sizes can range from small micron-sized particles to larger granules. Context in Claims: The ability to produce particles of different sizes allows the asphalt mix to be optimized for various applications, such as surface layers, base layers, or specialty high-performance asphalt.

An Asphalt Formulation: Definition: A mixture used to create road surfaces, consisting of aggregates (like gravel or sand), bitumen (as a binder), and additional materials such as plastic pellets or polymers to enhance performance. Context in Claims: The plastic pellets produced by the vessel are intended to be incorporated into various asphalt formulations, where they can improve properties such as flexibility, strength, thermal resistance, and durability, depending on the specific needs of the roadway application.

Figure 1:
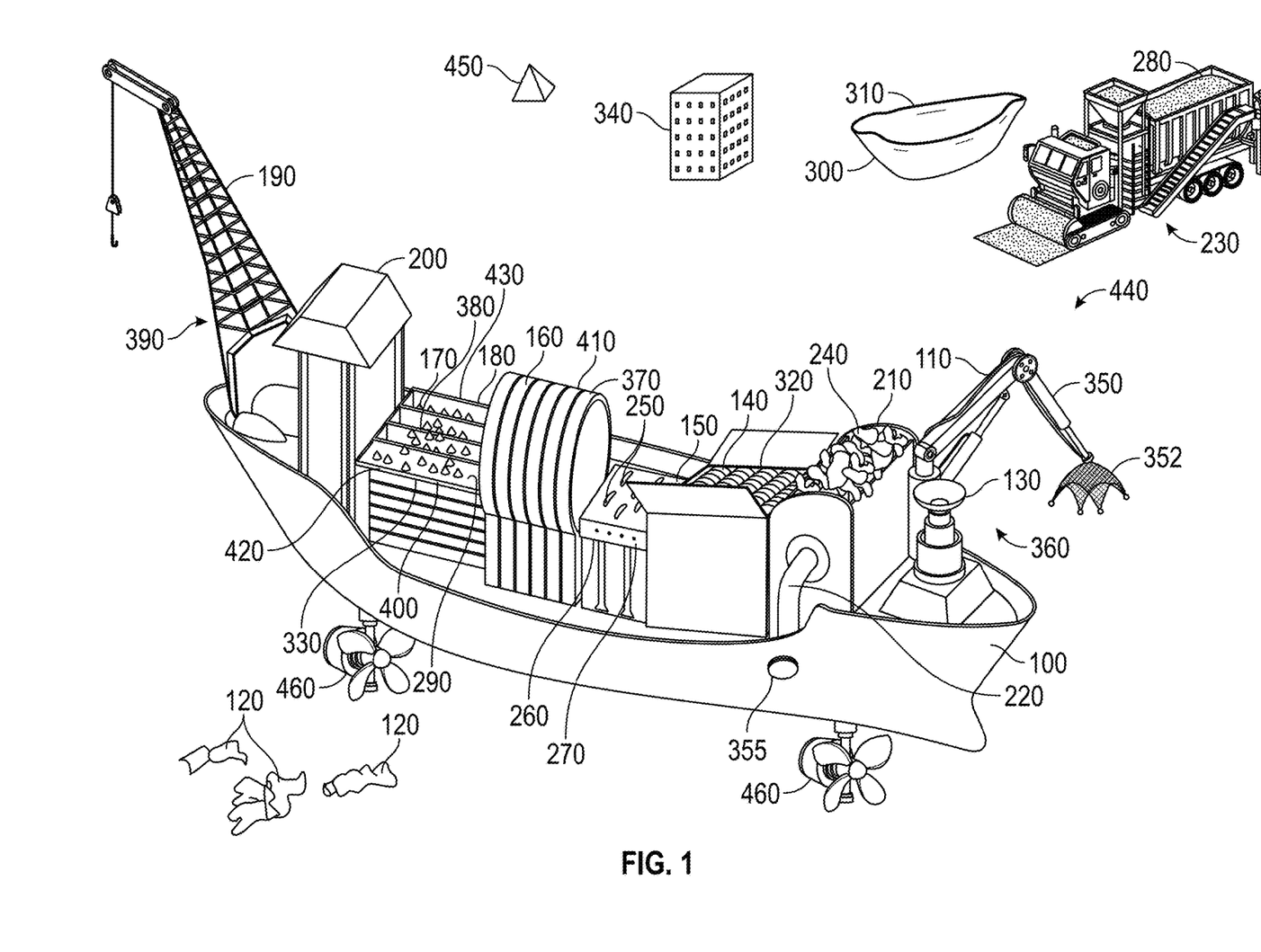
FIG. 1 is a 3D perspective view of the marine vessel with integrated plastic shredding and pelletizing system for ocean cleanup and repurposing into plastic asphalt according to the invention.
Figure 2:
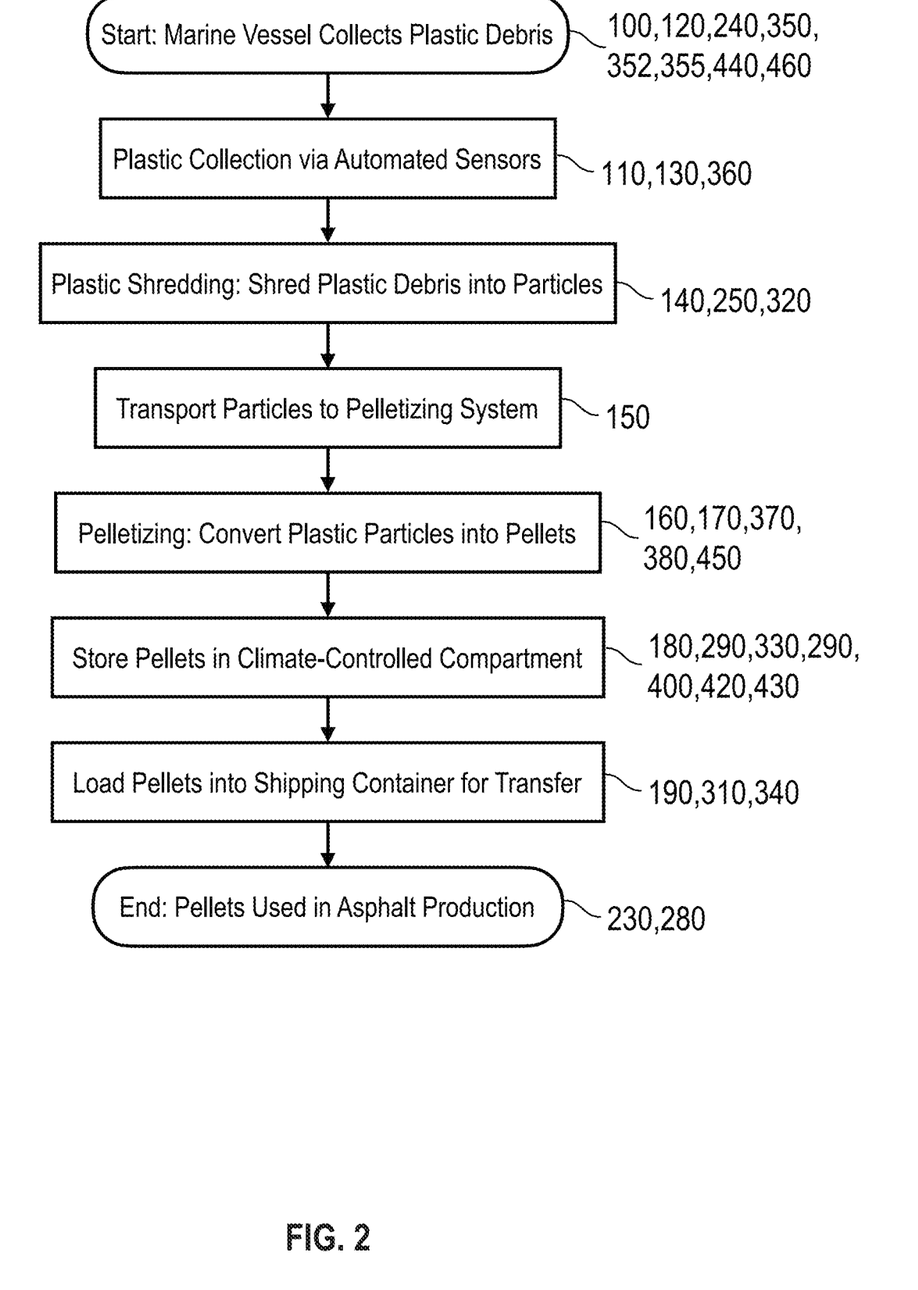
FIG. 2 is a flowchart illustrating the method of using the marine vessel with integrated plastic shredding and pelletizing system for ocean cleanup and repurposing into plastic asphalt according to the invention.

Index of Labelled Features in Figures. Features of the muncharoo invention are listed in numeric order by Figure in numeric order. Referring to the Figures, there is shown in FIGS. 1 and 2 the following features:

Element 100 which is a marine vessel for collecting, processing, and repurposing floating plastic detritus from ocean surfaces for reuse in the production of plastic asphalt.

Element 110 which is a plastic collection system.
Element 120 which is floating plastic debris.
Element 130 which is an automated sensor.
Element 140 which is a shredder.
Element 150 which is a conveyor system.
Element 160 which is a pelletizing system.
Element 170 which is a plurality of plastic pellets.
Element 180 which is a storage compartment.
Element 190 which is a crane system.
Element 200 which is a power generation system.
Element 210 which is an automated sorting system.
Element 220 which is a dewatering system.
Element 230 which is a production of plastic asphalt.
Element 240 which is collected plastic debris.
Element 250 which is a collection of shredded plastic particles.
Element 260 which is transport speed.
Element 270 which is input volume.
Element 280 which is a plastic asphalt mixture.
Element 290 which is a stable condition suitable for offloading.
Element 300 which is an adjacent vessel.
Element 310 which is a shore-based transport.
Element 320 which is an onboard shredder system.
Element 330 which is an onboard climate-controlled compartment.
Element 340 which is a shore-based facility.
Element 350 which is a mechanical arm mechanism.
Element 352 which is a net mechanism.
Element 355 which is a suction mechanism.
Element 360 which is an AI-based algorithm.
Element 370 which is a heating and cooling cycle that enhances a structural integrity.
Element 380 which is a separation of the plurality of plastic pellets.
Element 390 which is a container management system.
Element 400 which is the contents of each container.
Element 410 which is an energy recovery system.
Element 420 which is a storage of said plurality of plastic pellets.
Element 430 which is a stable internal temperature in said onboard climate-controlled compartment.
Element 440 which is a position of the marine vessel.
Element 450 which is a tetrahedron shape.
Element 460 which is an omni-directional propeller.

Novelty (35 U.S.C. § 102): To be patentable, an invention must be novel, meaning that it has not been previously disclosed or made available to the public in any form. The core features of the marine vessel in question, designed to collect and process plastic debris from the ocean, need to be evaluated against the known technologies to determine if they introduce unique innovations.

Novel Elements of the Invention:

Plastic Shredding and Pelletizing for Asphalt Production: This invention focuses on an onboard plastic pelletizing system that processes oceanic plastic debris specifically for reuse in plastic asphalt production. This use of plastic pellets as a construction material, particularly in asphalt for roads, appears to be a novel solution in marine waste management.

Integration of AI-Based Plastic Collection: The invention includes a system that employs AI and sensor technologies to detect areas of high plastic density in the ocean. This system allows the vessel to optimize plastic collection, improving efficiency and targeting specific areas for cleanup.

Renewable Energy-Powered Systems: The integration of solar panels, wind turbines, and other renewable energy sources to power the vessel's collection, shredding, and pelletizing systems distinguishes it from conventional marine vessels, which typically rely on diesel engines or fossil fuels.

Novelty Conclusion: No prior disclosure is known to integrate plastic collection, shredding, and pelletizing into a marine vessel powered by renewable energy specifically for the purpose of producing plastic asphalt. This combination of elements appears to be novel, especially given its specific goal of converting oceanic plastic waste into a viable construction material for roads. The integration of advanced sensing and AI technologies for waste collection also strengthens the novelty of the invention.

Non-Obviousness (35 U.S.C. § 103) An invention must also be non-obvious to be patentable. This means that, while some of the individual elements may exist in the prior art, the invention as a whole must present an improvement or combination that would not be readily apparent to someone skilled in the field.

Key Features Contributing to Non-Obviousness:

Comprehensive Solution for Plastic Asphalt Production: While technologies for ocean waste collection and processing exist, they generally focus on recycling or waste reduction in broader contexts. The present invention's focus on pelletizing shredded plastic debris onboard a vessel and preparing it for direct use in plastic asphalt production is a novel industrial application. This specific use case introduces a new method for addressing both environmental and infrastructure challenges simultaneously.

Automated and Optimized Collection Mechanism: The AI-powered plastic detection and collection system not only enhances the vessel's efficiency in targeting plastic waste but also represents a technological leap in ocean cleanup operations. AI optimization to enhance marine cleanup is an inventive step beyond manual or less sophisticated automated systems.

Energy-Efficient Processing System: The use of renewable energy sources such as solar panels and wind turbines to power the onboard operations (shredding, conveyor systems, and pelletizing) adds a layer of innovation by reducing the environmental footprint of the cleanup process itself. Prior solutions for ocean waste collection and processing typically rely on fossil fuels, which makes the renewable aspect non-obvious and forward-thinking.

Scalable and Modular Processing Systems: The onboard processing of plastic waste into pellets for use in asphalt is scalable, meaning the pellets can be used on a large scale for road construction projects. This operational flow from collection to processed product is distinct from prior art that may focus on collection and recycling but not on a direct, modular, and scalable reuse method.

Non-Obviousness Conclusion: The unique combination of shredding and pelletizing systems tailored for road construction, powered by renewable energy and optimized by AI, represents an inventive step that would not be obvious to someone skilled in the field. Individually, shredders, pelletizers, or renewable-powered vessels exist in various forms, but their integration into a cohesive system designed to solve both oceanic pollution and road infrastructure challenges presents an inventive, non-obvious improvement over prior technologies.

Final Analysis: The marine vessel with a plastic shredding and pelletizing system introduces key innovations that are both novel and non-obvious under U.S. patent law. The specific combination of elements—plastic collection and processing onboard a vessel, renewable energy systems, and the application of plastic waste in plastic asphalt—has not been disclosed in the prior art. Additionally, the integration of AI and sensor-based systems for optimizing plastic collection further strengthens the argument for non-obviousness, making the invention a significant step forward in addressing marine pollution and infrastructure development simultaneously.

How to Make the Invention:
Marine Vessel Design and Construction:

Vessel Hull and Framework: The marine vessel must be designed to operate efficiently in various oceanic conditions. The hull should be constructed using durable materials such as high-strength steel or reinforced composites to withstand long periods at sea and support the heavy equipment onboard. The design should allow for modular installation of the systems, such as the shredding, pelletizing, and renewable energy systems.

Energy Systems Installation: Solar Panels and Wind Turbines: Install solar panels on the deck and wind turbines in strategic positions to harness renewable energy. The energy generated by these systems will be used to power all onboard operations, making the vessel energy-efficient and self-sustaining during long missions. The system must also include energy storage systems such as lithium-ion batteries to store excess power for continuous operation during low sunlight or wind conditions. Hybrid Power Backup: Although renewable energy will be the primary power source, it's important to install a hybrid backup system, such as a diesel generator, to ensure the vessel can operate under all conditions, especially when energy demands exceed supply.

Plastic Collection System:
AI-Enhanced Collection Mechanism:

Collection Equipment: Equip the vessel with a combination of mechanical arms, nets, conveyor belts, and suction systems that can collect plastic debris floating on the ocean surface. This system must be robust enough to capture large macroplastics and microplastics and designed for flexible operation in rough seas.

AI and Sensor Systems: The collection system will be powered by an AI-based detection system that uses advanced sensors to locate areas of high plastic concentration. These sensors should include radar, cameras, and satellite data integration to provide real-time environmental feedback and precise targeting of plastic waste accumulations. The AI continuously monitors the collection system, adjusting the vessel's speed and collection path to optimize energy efficiency and waste collection.

Shredder and Conveyor Installation:

Shredding System: Install a high-efficiency plastic shredder onboard the vessel. The shredder should be able to process a wide variety of plastic types and sizes, including soft plastics, hard plastics, and fishing nets. The shredding mechanism should include multiple cutting blades that can be adjusted to the desired shredding size, allowing for adaptability based on the type of plastic debris collected. The shredded plastic particles will be sized for optimal processing in the pelletizing system.

Conveyor System: Connect the shredder to the pelletizing system using a modular conveyor belt. The conveyor system should be designed to handle varying amounts of shredded plastic and transport it quickly and efficiently to the pelletizer. The speed of the conveyor should be adjustable based on the shredder's output and the pelletizer's capacity.

Pelletizing System Installation: Pelletizing Machine: Install a plastic pelletizing machine that converts shredded plastic into small, uniform pellets suitable for use in plastic asphalt production. The system should include a heating chamber to melt the plastic, followed by a cooling mechanism that solidifies the pellets. The pellets should be of high structural integrity to ensure that they can be directly incorporated into construction materials. Advanced Cooling System: Incorporate a cooling system that utilizes seawater to solidify the plastic pellets efficiently. This system will provide rapid cooling, ensuring that the pellets maintain their uniform shape and quality. Additionally, include a filtration system to prevent contamination by saltwater during the cooling process.

Storage and Handling Systems:

Pellet Storage Compartments: Build climate-controlled storage compartments for the plastic pellets. These compartments must maintain optimal temperature and humidity levels to ensure the long-term integrity of the pellets. The compartments should also be modular and designed for easy loading into containers for transport to land or transfer to an adjacent ship.

Crane and Transfer System: Equip the vessel with a heavy-duty crane capable of lifting and transferring containers filled with plastic pellets. The crane must be designed to operate in rough sea conditions and capable of handling standard shipping containers, allowing seamless integration into existing transport and logistics systems.

How to Use the Invention:
Deployment of the Vessel:

Navigation to Target Areas: The vessel is equipped with real-time navigation systems powered by the AI-based sensors. Once the vessel is deployed, the navigation system identifies areas in the ocean where plastic debris tends to accumulate, such as gyres and convergence zones. The system continuously adjusts the vessel's route based on the density of plastic detected.

Plastic Collection: Once the vessel reaches a target area, the collection system is deployed. The mechanical arms, nets, and suction systems capture the floating plastic debris, funneling it into the shredding system. The AI ensures that the system operates at maximum efficiency, adjusting the vessel's speed and collection mechanisms based on the debris density and environmental conditions.

Shredding and Pelletizing Process:

Shredding the Plastic Waste: As the plastic debris is collected, it is fed into the shredder, which breaks the waste down into smaller particles. The shredded plastic is transported via the conveyor system to the pelletizing unit.

Pelletizing Process: The pelletizing machine processes the shredded plastic by heating it to the required temperature, melting it down, and forming it into small, uniform pellets. The cooling system rapidly solidifies the plastic into durable pellets suitable for plastic asphalt production. The pellets are then transferred to the climate-controlled storage compartments. Energy Use and Optimization:

Renewable Energy System in Action: The vessel's systems—shredding, pelletizing, and navigation—are primarily powered by renewable energy. The solar panels and wind turbines generate power throughout the day. During periods of low sunlight or wind, energy stored in the battery systems is used to power operations. The AI system constantly monitors energy levels, adjusting the collection speed and processing rates to balance power consumption with available energy.

Sustainability and Efficiency: The AI-driven system not only optimizes the collection of plastic but also adjusts the energy usage to ensure that the vessel operates in the most energy-efficient manner. By prioritizing areas with the highest plastic concentrations, the vessel minimizes wasted time and energy, making the operation highly efficient.

Logistics and Transfer of Pellets:

Storing and Transferring Pellets: Once a significant amount of plastic has been processed into pellets, the vessel's crane system is activated to load the pellets into standard shipping containers. The crane is designed to operate in rough conditions, ensuring safe and efficient loading. These containers can be transferred to an adjacent vessel for transport or offloaded when the vessel returns to port.

Use in Plastic Asphalt Production: The plastic pellets produced onboard are ready for immediate use in plastic asphalt production. These pellets can be transported to asphalt manufacturing plants, where they are mixed with other materials to create road surfaces. This direct application of the processed plastic in road construction ensures that the waste is transformed into a valuable product, supporting both environmental cleanup efforts and infrastructure development.

Key Benefits of the Invention

Energy Efficiency: The vessel's use of renewable energy reduces the carbon footprint of the entire operation and enhances its sustainability.

Immediate Plastic Repurposing: By pelletizing plastic waste onboard, the invention reduces the need for transporting unprocessed waste to shore, streamlining the recycling process.

Automation and AI: The integration of AI-based optimization for targeting plastic debris makes the system far more efficient than manual collection methods, ensuring that time and energy are used effectively.

Scalability: The modular design allows the vessel to scale its operations and adjust to varying levels of plastic waste, making it adaptable to different oceanic environments and waste densities.

The invention provides a comprehensive and self-sustaining solution for ocean plastic cleanup and recycling, turning environmental waste into a valuable industrial product with minimal impact on the ecosystem. The invention operates as a self-sustaining marine vessel capable of collecting plastic debris from the ocean, shredding and pelletizing the waste, and directly contributing to road construction by producing plastic pellets for use in plastic asphalt. The integration of AI-based sensors, renewable energy, and a complete onboard recycling process allows for an efficient and environmentally sustainable solution to ocean plastic pollution.

Key elements or features of the claims, which are detailed as follows:

Plastic collection system configured to capture a floating plastic debris from said ocean surface, said plastic collection system including at least one automated sensor to detect and target plastic waste: This describes the component responsible for collecting plastic debris from the ocean surface. It uses at least one automated sensor to identify and focus on areas where plastic waste is concentrated, allowing efficient collection.

Shredder operatively connected to said plastic collection system, configured to shred a collected plastic debris into a collection of shredded plastic particles of predetermined sizes optimized for subsequent pelletizing: After collecting the plastic debris, this shredder processes it into smaller particles. These particles are sized in a way that makes them ideal for the next stage of processing, which is pelletizing.

A conveyor system configured to transport said collection of shredded plastic particles from said shredder to a pelletizing system, said conveyor system being adjustable to vary a transport speed based on an input volume from said shredder: This conveyor system moves the shredded plastic particles from the shredder to the pelletizing system. Its speed can be adjusted depending on how much plastic is being processed, ensuring smooth operation and preventing bottlenecks.

Said pelletizing system mounted on said marine vessel, configured to process said collection of shredded plastic particles into a plurality of plastic pellets to include at least a first plastic pellet and a second plastic pellet that are uniformly shaped to optimize an incorporation into a plastic asphalt mixture: The pelletizing system converts shredded plastic into uniform pellets, which are then used in the production of plastic asphalt. The uniform shape and size of these pellets make them ideal for mixing into asphalt.

A storage compartment for holding said plurality of plastic pellets in a stable condition suitable for offloading, said storage compartment being climate-controlled to prevent degradation of said collected plastic debris: This is a specialized storage area on the vessel designed to keep the processed plastic pellets in good condition. The climate control feature ensures that the plastic doesn't degrade before it can be offloaded for use.

A crane system operatively connected to said marine vessel, configured to load and transfer a plurality of containers, including at least a first container and a second container, filled with said plurality of plastic pellets onto an adjacent vessel or onto a shore-based transport for further use in a highway construction: This crane system is used for loading the plastic pellets, which are stored in containers, onto other vessels or transport vehicles. This allows the processed plastic to be transported to a facility where it can be used in road construction.

A power generation system utilizing a plurality of renewable energy sources, said plurality of renewable energy sources including at least a solar panel or a wind turbine, to power said shredder, said pelletizing system, and said plastic collection system while minimizing environmental impact: The marine vessel is equipped with a renewable energy system, such as solar panels or wind turbines, which provides power for its operations, including the collection, shredding, and pelletizing processes. This minimizes the environmental footprint of the vessel.

A method for collecting, processing, and repurposing a floating plastic debris from an ocean surface for reuse in a production of a plastic asphalt: This claim describes the overall method for turning collected ocean plastic into plastic pellets that can be reused in asphalt production. It covers the entire process, from collection to processing and repurposing.

Detecting and collecting said floating plastic debris using a plastic collection system equipped with at least one automated environmental sensor: This is part of the method where the plastic collection system, equipped with sensors, detects and collects plastic debris from the ocean.

Shredding a collected plastic debris into a plurality of particles, said plurality of particles including at least a first particle and a second particle, all of which have a specified dimension using an onboard shredder system: This refers to the shredding process that converts the collected plastic into small particles of a specified size, ensuring consistency for subsequent processing.

Pelletizing said collection of shredded plastic particles into a plurality of durable pellets, said plurality of durable pellets including at least a first durable pellet and a second durable pellet, all of which are optimized for use in an asphalt production: After shredding, the plastic particles are converted into durable pellets suitable for asphalt production. Each pellet is optimized for this specific use.

Storing a plurality of plastic pellets to include at least a first plastic pellet and a second plastic pellet in an onboard climate-controlled compartment to ensure preservation of said plurality of plastic pellets during transportation: The pellets are stored in a climate-controlled compartment to preserve their quality during transport until they are ready to be used.

A plastic collection system comprises any combination of a mechanical arm, a net, and a suction mechanism that can operate autonomously to maximize efficiency in collecting plastic debris of varying sizes: This describes the components of the plastic collection system, which can include mechanical arms, nets, and suction devices. These work autonomously to collect various sizes of plastic debris from the ocean surface.

A plastic collection system is equipped with at least one AI-based algorithm configured to analyze environmental data to prioritize high-density areas of plastic waste for collection: The system includes AI technology that analyzes environmental data to find and prioritize areas with a high concentration of plastic waste, enhancing collection efficiency.

A shredder is configured to operate with variable-speed settings to adapt to different densities and sizes of said floating plastic debris collected from said ocean surface: The shredder can adjust its speed based on the size and density of the plastic debris it is processing, allowing it to handle different types of plastic waste efficiently.

A pelletizing system includes a heating and cooling cycle that enhances a structural integrity of said plurality of plastic pellets, ensuring suitability of said plurality of plastic pellets for extreme temperatures encountered during an asphalt application: The pelletizing system processes the plastic particles using a heating and cooling cycle. This improves the structural integrity of the pellets, making them suitable for use in asphalt applications that may be exposed to extreme temperatures.

An automated sorting system positioned before said shredder, configured to separate a non-plastic waste from said collected plastic debris to ensure efficient shredding and pelletizing: This sorting system is placed before the shredder to remove non-plastic waste from the collected debris, ensuring that only plastic is shredded and pelletized.

A storage compartment for said plurality of plastic pellets is designed with compartmentalized sections that allow for a segregation of said plurality of plastic pellets based on material properties or size distribution: The storage compartment has separate sections that can hold different types or sizes of plastic pellets, making it easier to manage and transport them.

A crane system is integrated with a container management system that tracks a contents of said plurality of containers using RFID or other tracking technologies to ensure seamless logistics for further use in an asphalt production: This crane system includes a tracking system to monitor the contents of each container, ensuring efficient management and logistics for transporting the pellets for asphalt production.

A power generation system is supplemented by an energy recovery system, which recaptures waste heat from said pelletizing system and reuses it to power said shredder, said pelletizing system, and said plastic collection system: The power generation system includes an energy recovery feature that captures and reuses waste heat from the pelletizing process to power other systems on the vessel, increasing efficiency.

Optionally there is a marine vessel as in claim one, wherein said pelletizing system is configured to produce said plastic pellets in the shape of a tetrahedron, wherein the tetrahedral shape enhances the interlocking properties and structural stability of said plastic pellets when used in asphalt mixtures, thereby improving the overall durability and performance of the plastic asphalt in road construction applications.

This claim specifies that the plastic pellets produced by the pelletizing system have a tetrahedral shape, which provides specific advantages in the context of the invention: Interlocking Properties: The unique tetrahedral shape allows the pellets to interlock more effectively compared to traditional spherical or cylindrical shapes. This feature is particularly beneficial for ensuring the stability and uniform distribution of the pellets within the plastic asphalt mixture. Enhanced Structural Stability: The interlocking nature of the tetrahedral pellets contributes to the overall strength and stability of the plastic asphalt, making the final road construction material more durable and resistant to cracking, deformation, and wear over time.

The addition of this claim further differentiates the invention from prior art and highlights the innovative use of geometry in enhancing the functional properties of the repurposed plastic pellets.

Marine Vessel for Collecting, Processing, and Repurposing Floating Plastic Detritus Plastic Collection System: Expanded Description: The plastic collection system is a critical component of the marine vessel, designed to capture floating plastic debris from the ocean surface. It consists of multiple collection mechanisms, including mechanical arms, nets, and suction devices. The mechanical arms can extend and retract to reach plastic debris that is spread out across the water's surface. Nets are deployed to capture smaller and more dispersed particles, while the suction devices are used for collecting microplastics and other small debris. This system is equipped with automated sensors that use AI-based algorithms to detect high-density areas of plastic waste. These sensors continuously scan the surrounding waters, identifying and prioritizing zones with the highest concentration of plastic debris, enabling targeted and efficient collection.

Front-End Shredder System: Expanded Description: The front-end shredder system is operatively connected to the plastic collection system and is designed to shred the collected plastic debris into smaller particles. The system includes variable-speed settings that can be adjusted based on the type and density of the plastic being processed. This flexibility allows the shredder to handle a wide range of plastic waste types, from soft plastic bags to harder materials like bottles and containers. The shredder consists of multiple rotating blades and cutting edges made from high-strength steel, ensuring durability and effectiveness in reducing the size of the plastic debris. The shredded particles are then optimized for the next stage of processing, the pelletizing system.

Conveyor System: Expanded Description: The conveyor system serves as the transport mechanism that moves the shredded plastic particles from the shredder to the pelletizing system. It is designed with adjustable speed settings that can vary based on the input volume and particle density, ensuring a consistent flow of material to the pelletizing system. The conveyor is equipped with a series of belts and rollers that are resistant to wear and corrosion, given the harsh marine environment. The system also includes sensors that monitor the volume and weight of the material being transported, allowing for real-time adjustments to prevent bottlenecks and ensure efficient processing.

Pelletizing System: Expanded Description: The pelletizing system is a specialized processing unit mounted on the marine vessel, designed to transform the shredded plastic particles into uniformly shaped plastic pellets. The system includes a series of extruders and molding units that compress and shape the plastic into pellets. The heating and cooling cycle incorporated into the system ensures that the pellets have the necessary structural integrity and temperature resistance required for their intended use in plastic asphalt mixtures. The uniform shape and size of the pellets improve their interlocking properties, which are essential for creating a durable and stable asphalt mix.

Climate-Controlled Storage Compartment: Expanded Description: This storage compartment is designed to hold the processed plastic pellets in a stable condition suitable for offloading. It is equipped with climate control features, including temperature and humidity regulation, to prevent the degradation of the plastic pellets. The compartment is divided into multiple sections, allowing for the segregation of pellets based on their material properties or size distribution. This organization facilitates efficient loading and unloading and ensures that the pellets maintain their quality during transport to their final destination.

Crane System: Expanded Description: The crane system is an integral part of the marine vessel, used for loading and transferring containers filled with plastic pellets onto adjacent vessels or shore-based transport systems. It includes a series of hydraulic arms and hoisting mechanisms capable of lifting heavy containers safely and efficiently. The system is equipped with an integrated container management system that uses RFID or other tracking technologies to monitor the contents and location of each container. This tracking capability ensures that the pellets are accurately accounted for and that their transport and logistics are managed seamlessly for further use in highway construction.

Power Generation System: Expanded Description: The power generation system utilizes renewable energy sources, including solar panels and wind turbines, to provide energy for the marine vessel's operations. The solar panels are positioned on the upper deck of the vessel, optimized to capture maximum sunlight throughout the day. The wind turbines are mounted on the vessel's superstructure and are designed to operate efficiently even in low wind conditions. Additionally, the system includes an energy recovery unit that captures waste heat from the pelletizing system and recycles it to power the shredder and collection systems. This combination of renewable and recovered energy sources minimizes the vessel's environmental impact and reduces reliance on fossil fuels.

Pelletizing System for Plastic Asphalt Mixture—Reinforcement Additives: Expanded Description: The pelletizing system is designed to incorporate reinforcement additives into the plastic pellets, such as glass fibers or recycled carbon fibers. These additives enhance the mechanical properties of the pellets, such as their tensile strength, durability, and adhesion to asphalt mixtures. The additives are mixed into the plastic during the pelletizing process, ensuring uniform distribution throughout each pellet. This improvement allows the plastic asphalt to perform better under extreme temperatures and heavy traffic conditions, making it a more reliable material for road construction.

Method for Collecting, Processing, and Repurposing Floating Plastic Debris-Detecting and Collecting Floating Plastic Debris: Expanded Description: The method involves using the plastic collection system equipped with automated sensors and AI-based algorithms to detect and collect floating plastic debris. The system scans the ocean surface and prioritizes areas with the highest concentration of plastic waste. Once a target area is identified, the mechanical arms and nets are deployed to gather the debris. Suction devices are used to collect smaller particles and microplastics. The collected plastic is then directed to the shredding system for further processing.

Shredding the Plastic Debris: Expanded Description: The collected plastic debris is shredded into smaller particles using an onboard shredder system. The system adjusts its speed and cutting mechanism based on the type and density of the plastic being processed. This flexibility allows the shredder to handle various types of plastic waste efficiently. The resulting particles are uniform in size, making them ideal for the next stage of processing, the pelletizing system.

Transporting and Pelletizing the Shredded Plastic: Expanded Description: The shredded plastic particles are transported via a conveyor system to the pelletizing system. The conveyor's speed is adjusted based on the input volume to ensure a consistent flow of material. In the pelletizing system, the plastic particles are heated, extruded, and cooled to form durable plastic pellets. These pellets are uniform in size and shape, and may include reinforcement additives to enhance their properties for asphalt production.

Storing and Transporting the Plastic Pellets: Expanded Description: After pelletizing, the plastic pellets are stored in a climate-controlled compartment to prevent degradation. The storage compartment is divided into sections to separate pellets based on their size or material properties. The stored pellets are then loaded into containers using the crane system. Each container is tracked using RFID technology to ensure proper handling and logistics during transport to their final destination.

Plastic Collection System with Autonomous Operation-Autonomous Operation: Expanded Description: The plastic collection system operates autonomously, using a combination of mechanical arms, nets, and suction mechanisms. These components work together to maximize the efficiency of plastic collection from the ocean surface. The autonomous system can adapt to different oceanic conditions and debris sizes, allowing for continuous operation without manual intervention.

Energy Recovery and Utilization-Energy Recovery System: Expanded Description: The energy recovery system captures waste heat generated during the pelletizing process and converts it into usable energy. This recovered energy is used to power other onboard systems, such as the shredder and plastic collection system. By recycling energy, the vessel reduces its overall energy consumption and environmental footprint.

Dewatering System—Dewatering System: Expanded Description: The dewatering system removes excess water from the collected plastic debris before it is shredded and pelletized. This system uses a combination of mechanical drying and heat to reduce the moisture content of the plastic, ensuring efficient processing in the shredder and pelletizing systems. The dewatered plastic is lighter and easier to handle, improving the efficiency of the entire process.

Real-Time Monitoring and Feedback-Sensor System for Real-Time Monitoring: Expanded Description: The sensor system continuously monitors the consistency, temperature, and composition of the collected plastic debris. Real-time data is fed to the control system, which adjusts the processing parameters accordingly. This feedback loop ensures that the shredded and pelletized plastic meets the desired quality standards, optimizing the overall efficiency of the system.

Tetrahedral Plastic Pellet Shape-Tetrahedral Pellet Shape: Expanded Description: The pelletizing system is configured to produce plastic pellets in a tetrahedral shape. This geometric configuration enhances the interlocking properties of the pellets, making them more stable and durable when used in asphalt mixtures. The tetrahedral shape also improves the structural integrity of the plastic asphalt, contributing to a longer-lasting and more resilient road surface. The tetrahedral shape of the plastic pellets plays a significant role in improving both the interlocking properties and structural stability of the plastic asphalt mixture, thereby enhancing the overall durability and performance of the asphalt in road construction applications. Here's how:

Interlocking Property:

Shape Geometry: The tetrahedral shape has a unique 3D geometry with four triangular faces. When mixed with other materials, the angled faces and sharp edges of the tetrahedral pellets allow them to interlock with each other more effectively than spherical or cylindrical shapes. This interlocking feature improves the stability of the aggregate mix, ensuring that the particles fit tightly together.

Increased Contact Points: The tetrahedral shape increases the number of contact points between the pellets and the other components of the asphalt mixture, such as stone aggregate and binder. These multiple contact points provide stronger mechanical bonding, reducing voids within the mixture and contributing to a more cohesive and structurally sound material.

Structural Stability:

Load Distribution: The interlocked tetrahedral pellets form a more rigid and supportive network within the asphalt mixture. This results in better load distribution when vehicles drive over the asphalt. As the load is evenly spread across the surface, the asphalt is less prone to deformation, rutting, or cracking over time.

Resistance to Movement: The interlocking mechanism created by the tetrahedral shape helps resist the lateral movement of the pellets within the mixture. This stability is essential for withstanding the stresses of traffic and temperature fluctuations, which can cause conventional materials to shift or settle unevenly.

Improved Durability and Performance:

Enhanced Durability: Because the tetrahedral pellets form a stable interlocking matrix, the plastic asphalt mixture has improved resistance to wear and tear. The durability is further enhanced by the structural rigidity provided by the pellets, making the asphalt less susceptible to damage from heavy loads, temperature changes, and environmental factors.

Longer Lifespan: With better load-bearing capabilities and less shifting or movement within the mixture, roads made with this asphalt will require less frequent repairs or resurfacing, extending the lifespan of the road. Additionally, the plastic pellets can contribute to the flexibility of the asphalt, reducing the risk of cracks or potholes in extreme temperatures.

Overall, the tetrahedral shape of the plastic pellets optimizes the structural performance of the asphalt, leading to long-lasting road surfaces that can endure the challenges of heavy traffic, extreme weather, and environmental wear. This shape not only enhances mechanical strength but also improves the interlocking nature of the materials, providing a high-performance, durable road solution.

In the claims, the method describes how the onboard shredder system can automatically adjust to create particles of varying sizes based on the end-use requirements for the plastic pellets in different asphalt formulations. The size of the shredded plastic particles can significantly affect the properties of the final asphalt mixture, and the system can adjust to produce optimal particle sizes depending on the intended application. Below is a breakdown of how particle sizes may vary for different asphalt formulations and end uses:

Fine Particles for Surface Asphalt (Wearing Course): Description: For the topmost layer of roads, called the wearing course, fine plastic particles are often required. These particles typically range in size from 0.1 mm to 3 mm in diameter. End-Use Requirement: Fine particles blend more seamlessly with asphalt binder, resulting in a smoother surface finish. This is important for the wearing course, where the surface must resist traffic wear, improve skid resistance, and reduce water permeability. Small particles allow for a more homogenous asphalt mix, which helps achieve these properties. Impact on Asphalt Performance: Smaller particles ensure better compaction and result in a durable, smooth surface that can withstand the mechanical stresses of traffic over time. They also reduce voids in the asphalt mixture, enhancing water resistance and preventing premature deterioration.

Medium-Sized Particles for Binder Course: Description: Medium-sized particles (typically 3 mm to 6 mm in diameter) are used in the binder course, which is the middle layer of the road structure. End-Use Requirement: In the binder course, the primary goal is structural integrity. Medium-sized plastic particles help create a robust asphalt mix that provides stability and strength to support the wearing course above it. Impact on Asphalt Performance: Medium-sized particles offer an excellent balance between flexibility and strength. They allow the binder course to act as a structural support, ensuring that the road can withstand heavier loads and distribute them effectively to lower layers.

Larger Particles for Base Asphalt: Description: For the base course, which forms the foundation of the road, larger plastic particles (typically 6 mm to 12 mm or even larger) may be preferred. End-Use Requirement: In the base course, the focus is on durability and load-bearing capacity. Larger plastic particles interlock with aggregates in the asphalt mixture, creating a stable and strong foundation layer that can support the upper layers of the road. Impact on Asphalt Performance: Larger particles contribute to a stronger load distribution network. This is critical for preventing the road from settling unevenly under traffic, particularly in areas where heavy vehicles frequently travel. The larger particles also help to manage thermal expansion and contraction, reducing cracking or deformation over time.

Mixed Particle Sizes for Specific Functional Additives: Description: In some specialized asphalt formulations, a mix of fine, medium, and large particles may be used to optimize specific properties, such as flexibility or thermal resistance. These mixed particle sizes help achieve specific end-use requirements for roads subjected to extreme temperatures or heavy mechanical stresses. End-Use Requirement: For example, roads in colder climates may require a more flexible asphalt mixture to withstand freeze-thaw cycles, while those in high-temperature regions may benefit from a mix designed to resist softening. Impact on Asphalt Performance: Mixed particle sizes ensure that the plastic pellets contribute to multiple performance factors in the asphalt, such as improved crack resistance, better handling of temperature fluctuations, and increased overall flexibility.

Micron-Sized Particles for Polymer-Modified Asphalt (PMA): Description: In some advanced applications, such as polymer-modified asphalt, micron-sized plastic particles (less than 1 mm in diameter) may be needed to enhance specific performance characteristics. End-Use Requirement: These tiny particles can act as performance enhancers, improving the binding quality between the asphalt and plastic additives, increasing the elasticity of the asphalt, and improving resistance to cracking. Impact on Asphalt Performance: The small size allows the plastic to integrate seamlessly into the asphalt matrix, enhancing its ability to flex under load without fracturing, particularly in high-stress areas such as intersections or airport runways.

Custom Particle Sizes for Specialty Applications (e.g., High-Performance Asphalt): Description: In highly specialized applications, such as high-performance asphalt used for airports, race tracks, or heavy industrial areas, the particle size can be finely tuned to match the specific mechanical requirements of the asphalt. End-Use Requirement: Custom-sized plastic particles can be designed to meet the precise load-bearing, temperature resistance, and wear requirements of these specialty applications. Impact on Asphalt Performance: Adjusting particle size allows the asphalt to meet extreme performance demands, providing higher resistance to wear, greater longevity, and better overall road performance in these unique environments.

Automatic Shredder Adjustment: Real-Time Control: The shredder system on the marine vessel is equipped with sensors and control algorithms that allow it to automatically adjust the size of the shredded plastic particles in real time. Based on the required end-use formulation for the asphalt, the system can switch between producing fine, medium, or large particles. This flexibility ensures that the processed plastic can be used for different layers and applications in road construction, optimizing the performance of the asphalt.

Particles of varying sizes are crucial for tailoring the asphalt mixture to meet specific mechanical, structural, and environmental requirements. By automatically adjusting the size of the shredded plastic particles, the system ensures that the plastic pellets are optimized for each unique asphalt formulation, enhancing the overall durability, performance, and longevity of the roads.

According to a preferred embodiment of the invention, there is a marine vessel for collecting, processing, and repurposing a floating plastic debris from an ocean surface for reuse in a production of plastic asphalt, comprising: a plastic collection system configured to capture said floating plastic debris from said ocean surface, said plastic collection system including at least one automated sensor to detect and target a high-density area of said floating plastic debris; a front-end shredder system operatively connected to said plastic collection system, said front-end shredder system configured to operate with a plurality of speed settings, comprising at least a first speed setting and a second speed setting, to shred said floating plastic debris into a collection of shredded plastic particles of a predetermined size optimized for subsequent pelletizing; a conveyor system configured to transport said collection of shredded plastic particles from said front-end shredder system to a pelletizing system, said conveyor system being adjustable to vary a transport speed based on an input volume and a particle density of said collection of shredded plastic particles; said pelletizing system mounted on said marine vessel, configured to process said collection of shredded plastic particles into a plurality of plastic pellets, said plurality of plastic pellets including at least a first plastic pellet and a second plastic pellet, and wherein said plurality of plastic pellets are uniformly shaped to optimize an incorporation into a plastic asphalt mixture; a storage compartment for holding said plurality of plastic pellets in a stable condition suitable for offloading, said storage compartment being climate-controlled to prevent degradation of said plurality of plastic pellets; a crane system operatively connected to said marine vessel, configured to load and transfer a plurality of containers, including at least a first container and a second container, filled with said plurality of plastic pellets onto an adjacent vessel or onto a shore-based transport for further use in a highway construction; and a power generation system utilizing a plurality of renewable energy sources, said plurality of renewable energy sources including at least a solar panel or a wind turbine, to power said front-end shredder system, said pelletizing system, and said plastic collection system while minimizing an environmental impact.

According to an alternate embodiment of the invention, there is a marine vessel wherein said pelletizing system is configured to produce said plurality of plastic pellets with a plurality of material properties, including a temperature resistance and an adhesion optimization, that enhance a use of said plurality of plastic pellets in said production of plastic asphalt for a paving or a repaving of a roadway.

According to a preferred embodiment of the invention, there is a method of using a marine vessel for collecting, processing, and repurposing a floating plastic debris from an ocean surface for reuse in a production of a plastic asphalt, comprising: detecting and collecting said floating plastic debris using a plastic collection system equipped with at least one automated environmental sensor; shredding said floating plastic debris into a plurality of plastic particles, said plurality of plastic particles including at least a first plastic particle and a second plastic particle, all of which have a specified dimension using an onboard shredder system; transporting said plurality of plastic particles via a conveyor system to a pelletizing system; pelletizing said plurality of plastic particles into a plurality of plastic pellets, said plurality of plastic pellets including at least a first plastic pellet and a second plastic pellet, all of which are optimized for use in an asphalt production; storing said plurality of plastic pellets in an onboard climate-controlled compartment to ensure preservation of said plurality of plastic pellets during transportation; and loading a shipping container with said plurality of plastic pellets using a crane system for transfer to an adjacent vessel or a shore-based facility for use in said asphalt production.

According to an alternate embodiment of the invention, there is a marine vessel wherein said plastic collection system comprises a combination of a mechanical arm mechanism, a net mechanism, and a suction mechanism that can operate autonomously to maximize efficiency in collecting a plastic debris of varying sizes.

According to an alternate embodiment of the invention, there is a marine vessel wherein said plastic collection system is equipped with at least one AI-based algorithm configured to analyze an environmental data to prioritize said high-density area of said floating plastic debris for collection.

According to an alternate embodiment of the invention, there is a marine vessel wherein said front-end shredder system is configured to operate with said plurality of speed settings to adapt to different densities and sizes of said floating plastic debris collected from said ocean surface.

According to an alternate embodiment of the invention, there is a marine vessel wherein said pelletizing system includes a heating and cooling cycle that enhances a structural integrity of said plurality of plastic pellets, ensuring suitability of said plurality of plastic pellets for extreme temperatures encountered during an asphalt application.

According to an alternate embodiment of the invention, there is a marine vessel further comprising an automated sorting system positioned before said front-end shredder system, configured to separate a non-plastic waste from said collected plastic debris to ensure efficient shredding and pelletizing.

According to an alternate embodiment of the invention, there is a marine vessel wherein said storage compartment for said plurality of plastic pellets is designed with a compartmentalized section configured to allow for a separation of said plurality of plastic pellets based on a material properties or a size distribution.

According to an alternate embodiment of the invention, there is a marine vessel wherein said crane system is integrated with a container management system that tracks a contents of each of said plurality of containers using RFID (Radio-Frequency Identification) or other tracking technologies to ensure a seamless logistics for further use in an asphalt production.

According to an alternate embodiment of the invention, there is a marine vessel wherein said power generation system is supplemented by an energy recovery system, which recaptures a waste heat from said pelletizing system and reuses said waste heat to power said front-end shredder system, said pelletizing system, and said plastic collection system.

According to an alternate embodiment of the invention, there is a method of using a marine vessel wherein said plurality of plastic pellets produced by said pelletizing system are designed to include binding agents that enhance an integration of said plurality of plastic pellets into an asphalt mixture for an increased durability.

According to an alternate embodiment of the invention, there is a method of using a marine vessel further comprising a step of automatically adjusting said onboard shredder system to create particles of varying sizes depending on an end-use requirement of said plurality of plastic pellets in an asphalt formulation.

According to an alternate embodiment of the invention, there is a method of using a marine vessel wherein a storage of said plurality of plastic pellets is optimized by maintaining a stable internal temperature in said onboard climate-controlled compartment to prevent any molecular degradation of said plurality of plastic pellets during transport.

According to an alternate embodiment of the invention, there is a method of using a marine vessel wherein said plastic collection system uses real-time monitoring of at least one oceanic condition to adjust a position of said marine vessel for maximum collection efficiency.

According to an alternate embodiment of the invention, there is a marine vessel wherein said pelletizing system is configured to produce said plurality of plastic pellets with a plurality of reinforcement additives, including at least a glass fiber, to improve mechanical properties of said plastic pellets when used in an asphalt production.

According to an alternate embodiment of the invention, there is a marine vessel further comprising a dewatering system integrated with said plastic collection system, configured to remove an excess water from said collected plastic debris before shredding and pelletizing.

According to an alternate embodiment of the invention, there is a marine vessel wherein said pelletizing system is configured to produce said plastic pellets in a tetrahedral shape, wherein said tetrahedral shape enhances an interlocking property and a structural stability of said plastic pellets when used in said plastic asphalt mixture, thereby improving overall durability and performance of said plastic asphalt mixture in road construction applications.

Advantages of the Present Invention: The invention of a marine vessel with an integrated plastic shredding and pelletizing system for ocean cleanup and repurposing into plastic asphalt offers several key advantages over existing technologies. These advantages highlight the efficiency, sustainability, and innovation embedded in the invention.

Onboard Plastic Waste Processing:

One of the primary advantages of this invention is its ability to process collected plastic waste directly onboard the vessel. Unlike traditional marine cleanup systems that collect plastic for transportation to onshore recycling facilities, this vessel is equipped with shredding and pelletizing systems. This offers multiple benefits:

Reduced Logistical Costs: Eliminates the need for transporting unprocessed plastic waste to land-based facilities, reducing overall logistical complexity.

Immediate Reuse of Waste: The shredded and pelletized plastic can be directly repurposed into plastic asphalt for road construction, transforming waste into a valuable resource without intermediate steps.

Minimizing Waste Handling: By processing the waste immediately, there is less risk of plastic waste being lost during transportation, minimizing environmental impact.

Sustainability Through Renewable Energy: The vessel's operations are powered by renewable energy systems including solar panels and wind turbines, which provides a significant environmental advantage: Lower Carbon Footprint: Conventional vessels rely on diesel engines, contributing to greenhouse gas emissions. By using renewable energy, this vessel significantly reduces its operational carbon footprint. Self-Sustaining Operations: The renewable energy systems ensure that the vessel can operate for longer periods in remote ocean areas without the need for refueling, enhancing its efficiency in collecting and processing plastic debris.

Efficiency with AI-Driven Plastic Collection: The invention incorporates AI-based sensors and automation to optimize the collection process, making it more effective at targeting high-density areas of plastic debris: Targeted Collection: AI-driven systems analyze real-time data to identify regions of the ocean where plastic debris is most concentrated, improving the efficiency of the collection process and reducing energy consumption by avoiding low-density areas. Reduced Human Intervention: The automated system requires less manual operation, allowing for a more continuous and consistent plastic collection effort, minimizing downtime.

Scalable Plastic Asphalt Production: The pelletizing system onboard the vessel produces plastic pellets that are specifically optimized for use in plastic asphalt production. This offers a number of scalable benefits: Practical Industrial Application: The pellets created are ready for integration into road construction materials, providing an immediate, practical use for the collected plastic waste. Mass Production Capabilities: The system is capable of processing large volumes of plastic waste into uniform pellets, allowing for high-throughput operations, which is essential in large-scale ocean cleanup and infrastructure projects.

Minimizing Environmental Impact: Overall, the invention reduces both marine and atmospheric pollution by addressing two key environmental issues: Ocean Plastic Pollution: By actively removing plastic from the ocean and converting it into a reusable product, the vessel contributes directly to reducing oceanic pollution. Air Pollution: The vessel's reliance on renewable energy mitigates the harmful emissions commonly associated with traditional marine operations, contributing to cleaner air and helping in the fight against climate change.

Adaptability and Flexibility: The vessel's modular design and onboard processing capabilities allow it to be adaptable to different types of oceanic plastic waste, including large plastic detritus, microplastics, and other marine debris: Wide Range of Applications: The system can be deployed in various ocean environments and can process a wide variety of plastic types, making it versatile for use in multiple cleanup operations worldwide.

The present invention provides a holistic and innovative solution to the problem of ocean plastic pollution. By integrating shredding, pelletizing, and renewable energy systems into a single vessel, it offers significant operational efficiency, environmental sustainability, and practical reuse of plastic waste in industrial applications like road construction. These advantages position the invention as a substantial improvement over existing marine waste collection systems.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A marine vessel for collecting, processing, and repurposing a floating plastic debris from an ocean surface for reuse in a production of plastic asphalt, comprising:
   a plastic collection system configured to capture said floating plastic debris from said ocean surface, said plastic collection system including at least one automated sensor to detect and target an area of said floating plastic debris having a higher density than surrounding areas;
   a front-end shredder system operatively connected to said plastic collection system, said front-end shredder system configured to operate with a plurality of speed settings, to shred said floating plastic debris into a collection of shredded plastic particles of a predetermined size optimized for subsequent pelletizing;
   a conveyor system configured to transport said collection of shredded plastic particles from said front-end shredder system to a pelletizing system, said conveyor system being adjustable to vary a transport speed based on an input volume and a particle density of said collection of shredded plastic particles;
   said pelletizing system mounted on said marine vessel, and configured to process said collection of shredded plastic particles into a plurality of plastic pellets, and wherein said plurality of plastic pellets are uniformly shaped to optimize an incorporation into a plastic asphalt mixture;
   a storage compartment for holding said plurality of plastic pellets in a condition suitable for offloading, said storage compartment being climate-controlled to prevent degradation of said plurality of plastic pellets;
   a crane system operatively connected to said marine vessel, configured to load and transfer a plurality of containers, including at least a first container and a second container, filled with said plurality of plastic pellets onto an adjacent vessel or onto a shore-based transport for further use in a highway construction; and
   a power generation system utilizing a plurality of renewable energy sources, said plurality of renewable energy sources including at least a solar panel or a wind turbine, to power said front-end shredder system, said pelletizing system, and said plastic collection system while minimizing an environmental impact.

2. The marine vessel of claim 1, wherein said pelletizing system is configured to produce said plurality of plastic pellets with a plurality of material properties, including a temperature resistance and an adhesion optimization, that enhance a use of said plurality of plastic pellets in said production of plastic asphalt for a paving or a repaving of a roadway.

3. The marine vessel of claim 1, wherein said plastic collection system comprises a combination of a mechanical arm mechanism, a net mechanism, and a suction mechanism that can operate autonomously to maximize efficiency in collecting said plastic debris having varying sizes.

4. The marine vessel of claim 1, wherein said plastic collection system is equipped with at least one AI-based algorithm configured to analyze an environmental data to prioritize said area of said floating plastic debris for collection.

5. The marine vessel of claim 1, wherein said front-end shredder system is configured to operate with said plurality of speed settings to adapt to different densities and sizes of said floating plastic debris collected from said ocean surface.

6. The marine vessel of claim 1, wherein said pelletizing system includes a heating and cooling cycle that enhances a structural integrity of said plurality of plastic pellets, ensuring suitability of said plurality of plastic pellets for temperatures encountered during an asphalt application.

7. The marine vessel of claim 1, further comprising an automated sorting system positioned before said front-end shredder system, configured to separate a non-plastic waste from said floating plastic debris to ensure efficient shredding and pelletizing.

8. The marine vessel of claim 1, wherein said storage compartment for said plurality of plastic pellets is designed with a compartmentalized section configured to allow for a separation of said plurality of plastic pellets based on a material property or a size distribution.

9. The marine vessel of claim 1, wherein said crane system is integrated with a container management system that tracks a content of each of said plurality of containers using a tracking technology to ensure seamless logistics for further use in said production of the plastic asphalt.

10. The marine vessel of claim 9, wherein said tracking technology is a RFID (Radio-Frequency Identification) or a GPS (Global Positioning System).

11. The marine vessel of claim 1, wherein said power generation system is supplemented by an energy recovery system, which recaptures a waste heat from said pelletizing system and reuses said waste heat to power said front-end shredder system, said pelletizing system, and said plastic collection system.

12. The marine vessel of claim 1, wherein said pelletizing system is configured to produce said plurality of plastic pellets with a plurality of reinforcement additives, including at least a glass fiber, to improve mechanical properties of said plurality of plastic pellets when used in an asphalt production.

13. The marine vessel of claim 1, further comprising a dewatering system integrated with said plastic collection system, configured to remove an excess water from said floating plastic debris collected from said ocean surface before shredding and pelletizing.

14. The marine vessel of claim 1, wherein said pelletizing system is configured to produce said plurality of plastic pellets in a tetrahedral shape, wherein said tetrahedral shape enhances an interlocking property and a structural stability of said plastic pellets when used in said plurality of plastic asphalt mixture, thereby improving overall durability and performance of a plastic asphalt mixture in road construction applications.

15. A method of using a marine vessel for collecting, processing, and repurposing a floating plastic debris from an ocean surface for reuse in a production of a plastic asphalt, comprising:

detecting and collecting said floating plastic debris using a plastic collection system equipped with at least one automated environmental sensor;

shredding said floating plastic debris into a plurality of plastic particles using an onboard shredder system, all of which have a specified dimension;

transporting said plurality of plastic particles via a conveyor system to a pelletizing system;

pelletizing said plurality of plastic particles into a plurality of plastic pellets, all of said plurality of plastic pellets are optimized for use in said production of the plastic asphalt;

storing said plurality of plastic pellets in an onboard climate-controlled compartment to ensure preservation of said plurality of plastic pellets during transportation;

loading a shipping container with said plurality of plastic pellets using a crane system for transfer to an adjacent vessel or a shore-based facility for use in said production of the plastic asphalt; and powering said shredder system, said pelletizing system, and said plastic collection system using a power generation system including at least a solar panel or a wind turbine.

16. The method of claim 15, wherein said plurality of plastic pellets produced by said pelletizing system are configured to include binding agents that enhance an integration of said plurality of plastic pellets into an asphalt mixture for an increased durability.

17. The method of claim 15, further comprising a step of automatically adjusting said onboard shredder system to create particles of varying sizes depending on an end-use requirement of said plurality of plastic pellets in said production of the plastic asphalt.

18. The method of claim 15, wherein said storing of said plurality of plastic pellets is optimized by maintaining a internal temperature in said onboard climate-controlled compartment to prevent any molecular degradation of said plurality of plastic pellets during transport.

19. The method of claim 15, wherein said plastic collection system uses real-time monitoring of at least one oceanic condition to adjust a position of said marine vessel for maximum collection efficiency.

\* \* \* \* \*